(12) United States Patent
Prasanna et al.

(10) Patent No.: US 8,375,395 B2
(45) Date of Patent: Feb. 12, 2013

(54) SWITCH-BASED PARALLEL DISTRIBUTED CACHE ARCHITECTURE FOR MEMORY ACCESS ON RECONFIGURABLE COMPUTING PLATFORMS

(75) Inventors: Deepak Prasanna, Rockwell, TX (US); Matthew Pascal DeLaquil, Rockwall, TX (US)

(73) Assignee: L3 Communications Integrated Systems, L.P., Greenvile, TX (US)

( * ) Notice: Subject to any disclaimer, the term of this patent is extended or adjusted under 35 U.S.C. 154(b) by 1252 days.

(21) Appl. No.: 11/969,003

(22) Filed: Jan. 3, 2008

(65) Prior Publication Data
US 2009/0178043 A1    Jul. 9, 2009

(51) Int. Cl.
G06F 9/46 (2006.01)
G06F 15/00 (2006.01)
G06F 15/76 (2006.01)

(52) U.S. Cl. ............... 718/105; 712/10; 712/11; 712/15; 712/17

(58) Field of Classification Search ............... None
See application file for complete search history.

(56) References Cited

U.S. PATENT DOCUMENTS

| | | | | |
|---|---|---|---|---|
| 6,738,891 | B2 * | 5/2004 | Fujii et al. | 712/16 |
| 7,181,588 | B2 * | 2/2007 | Johnson et al. | 711/173 |
| 7,412,586 | B1 * | 8/2008 | Rajopadhye et al. | 712/10 |
| 2004/0103264 | A1 * | 5/2004 | Fujii et al. | 712/15 |
| 2005/0177670 | A1 * | 8/2005 | Fujimoto et al. | 710/317 |
| 2007/0162911 | A1 * | 7/2007 | Kohn et al. | 718/107 |

OTHER PUBLICATIONS

Eggers et al., "Fast Reconfigurable Crossbar Switching in FPGAs", 1996, FPL'96.*

* cited by examiner

*Primary Examiner* — Qing Wu
(74) *Attorney, Agent, or Firm* — Hovey Williams LLP

(57) ABSTRACT

A computing architecture comprises a plurality of processing elements to perform data processing calculations, a plurality of memory elements to store the data processing results, and a reconfigurable interconnect network to couple the processing elements to the memory elements. The reconfigurable interconnect network includes a switching element, a control element, a plurality of processor interface units, a plurality of memory interface units, and a plurality of application control units. In various embodiments, the processing elements and the interconnect network may be implemented in a field-programmable gate array.

7 Claims, 1 Drawing Sheet

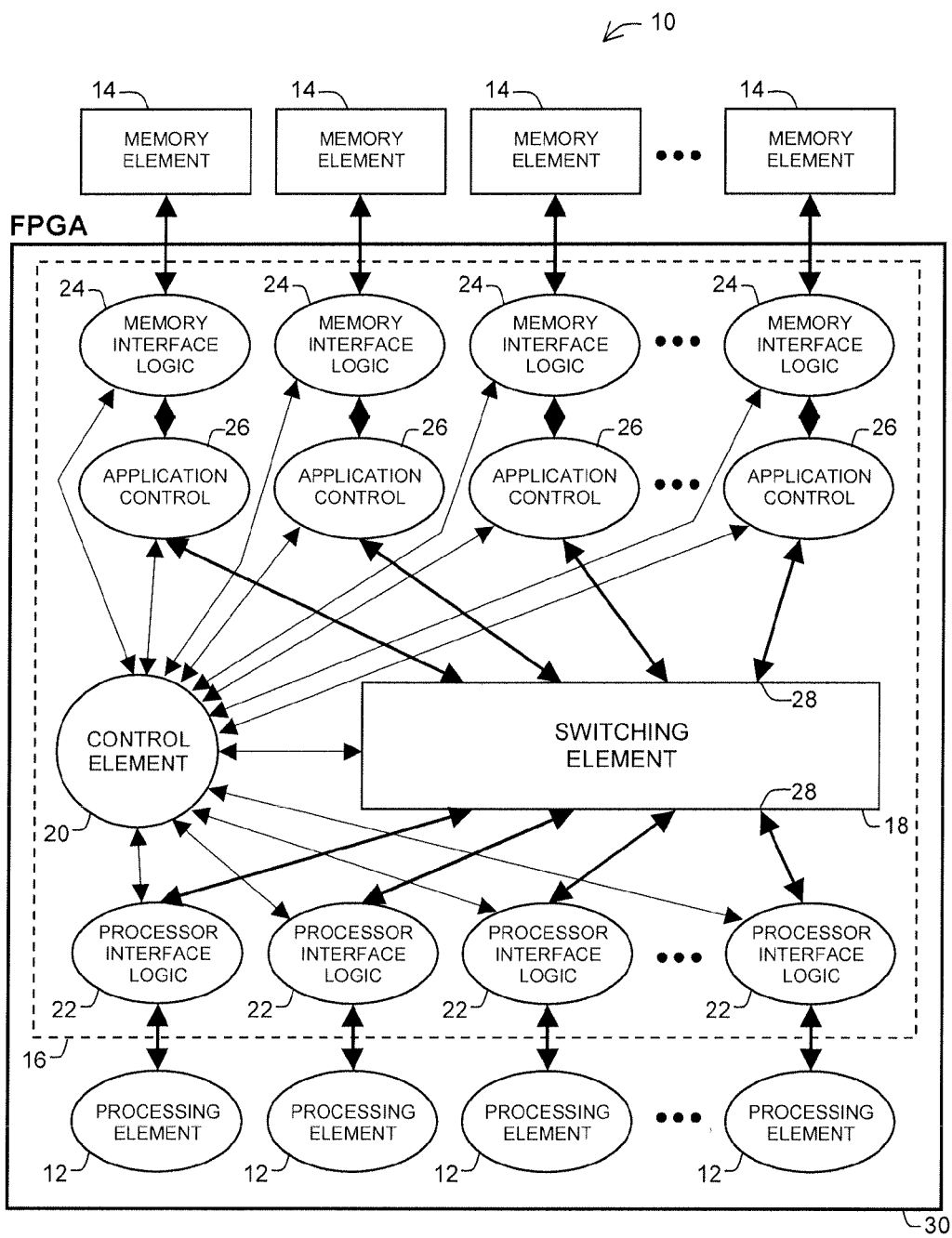

SWITCH-BASED PARALLEL DISTRIBUTED CACHE ARCHITECTURE FOR MEMORY ACCESS ON RECONFIGURABLE COMPUTING PLATFORMS

BACKGROUND OF THE INVENTION

1. Field of the Invention

Embodiments of the present invention relate to reconfigurable computing architectures. More particularly, embodiments of the present invention relate to reconfigurable computing architectures that allow a plurality of processing elements to communicate with a plurality of memory elements.

2. Description of the Related Art

Computing architectures, particularly for digital signal processing (DSP) and high-performance computing (HPC), typically include a processing element coupled to a memory element and often include a plurality of processing elements accessing a plurality of memory elements. The communication architecture between the processors and the memory may include a switching element, such as a crossbar switch. While the switch may be programmable, in that any input may be routed to any output, the switch often comprises static switching elements that are not reconfigurable. Furthermore, the processor-switch-memory architecture may not be flexible to accommodate variations in the types of processor or memory elements that are utilized in the architecture. The processing and memory elements may not be capable of executing more than one type of application, particularly executing more than one type of application simultaneously.

SUMMARY OF THE INVENTION

Embodiments of the present invention solve the above-mentioned problems and provide a distinct advance in the art of reconfigurable computing architectures. More particularly, embodiments of the invention provide a plurality of processing elements coupled to a plurality of memory elements through an interconnect network that includes a custom interface for each processor and memory as well as specific components for each application.

In various embodiments, the computing architecture includes a plurality of application-specific processing elements, a plurality of memory elements, and a reconfigurable interconnect network. The processing elements are operable to perform standard DSP functions. The memory elements are operable to store initial data sets and intermediate processing results.

The reconfigurable interconnect network includes a switching element, a control element, a plurality of processor interface units, a plurality of memory interface units, and a plurality of application control units. The switching element provides a data path from any processing element to any memory element. The control element manages the operation of the interconnect network by setting prioritization of processing data, scheduling of processing tasks and memory access, and load balancing of data flow. Each processor interface unit is associated with a processing element and manages the flow of data to and from the processing element based on the processing element's capabilities. Each memory interface unit is associated with a memory element and manages the flow of data to and from the memory element based on the physical configuration of the memory element. Each application control unit is associated with a memory interface unit and manages the flow of data to and from the memory interface unit based on the application for which the memory element is storing data.

In various embodiments, the processing elements and the reconfigurable interconnect network are both implemented in a field-programmable gate array (FPGA), while the memory elements are implemented separately from the FPGA.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the preferred embodiments and the accompanying drawing FIGURE.

BRIEF DESCRIPTION OF THE DRAWING FIGURE

A preferred embodiment of the present invention is described in detail below with reference to the attached drawing FIG. 1, which is a block diagram of a computing architecture constructed in accordance with various embodiments of the present invention.

The drawing FIGURE does not limit the present invention to the specific embodiments disclosed and described herein. The drawing is not necessarily to scale, emphasis instead being placed upon clearly illustrating the principles of the invention.

DETAILED DESCRIPTION OF THE PREFERRED EMBODIMENTS

The following detailed description of the invention references the accompanying drawing that illustrates specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A block diagram of a computing architecture 10 constructed in accordance with various embodiments of the present invention is illustrated in FIG. 1. The computing architecture 10 comprises a plurality of processing elements 12, a plurality of memory elements 14, and a reconfigurable interconnect network 16.

In various embodiments, each processing element 12 may be configured for a specific application or operation. The applications include, but are not limited to, solving systems of linear equations for use with computational fluid dynamics, computational electromagnetics, image processing, and data fusion; calculating discrete or fast Fourier transforms (FFTs) and inverse FFTs, filtering signals utilizing finite-impulse response (FIR) or infinite-impulse response (IIR) filtering, and other matrix or vector-based calculations. In some embodiments, the architecture 10 may include more than one processing element 12 with the same configuration to operate on the same application to improve computational throughput. In other embodiments, the architecture 10 may include processing elements 12 with different configurations to operate on different applications. Alternatively, one or more processing elements 12 may have a generalized configuration that allows the processing element 12 to operate on more than one application.

The processing element 12 may perform mathematical operations such as addition, subtraction, multiplication, or division using floating-point or fixed-point numerical representation, as well as logical operations such as AND, OR, XOR, and NOT in addition to shifting data in binary form. The processing element 12 may include adders, subtracters, multipliers, dividers, multiply-accumulators (MAC), logic gates, shift registers, storage registers such as flip flops and latches, combinations thereof, and the like.

In various embodiments, the processing element 12 may be formed from digital logic circuitry, analog circuitry, or a combination of both. The processing element 12 may be described as one or more code segments of a hardware description language (HDL) and may be implemented in a field-programmable gate array (FPGA) or other programmable logic device (PLD). The processing element 12 may also include a microprocessor, a microcontroller, or programmable interface controller/computer (PIC), or combinations thereof. Furthermore, the processing element 12 may include either fully-custom or semi-custom application-specific integrated circuitry (ASIC).

In various embodiments, each memory element 14 may be configured to store the data related to a specific application—the application as discussed above. In a similar fashion to the processing element 12, each memory element 14 may store data for a different application, or more than one memory element 14 more store data for the same application, or one memory element 14 may store data for a plurality of applications.

In various embodiments, each memory element 14 may represent a physically separate memory device. In other embodiments, one or more memory elements 14 may logically exist within the same physical storage device. Alternatively, one memory element 14 may include a plurality of physical storage devices.

The memory element 14 may be described as one or more code segments of an HDL and may be implemented in an FPGA or other PLD. The memory element 14 may have one or more multi-bit address busses, one or more read data ports, and one or more write data ports. The memory element 14 may also include storage registers such as flip flops or latches, random-access memory (RAM) such as static RAM (SRAM) or dynamic RAM (DRAM), programmable read-only memory (PROM) such as an erasable PROM (EPROM), cache memory, flash memory, hard-disk drives, floppy disks, optical disks, and the like, or combinations thereof.

The reconfigurable interconnect network 16 provides communication between the processing elements 12 and the memory elements 14. In various embodiments, the reconfigurable interconnect network 16 includes a switching element 18, a control element 20, a plurality of processor interface units 22, a plurality of memory interface units 24, and a plurality of application control units 26.

In various embodiments, the switching element 18 provides a data path from any processing element 12 to any memory element 14. The switching element 18 may include a plurality of ports 28 which may be coupled to the processing interface units 22 and the application control units 26. The ports 28 are generally bidirectional to allow data to flow to and from each processing element 12 and each memory element 14.

Generally, it is shown and discussed that data flows from a processing element 12 through the switching element 18 to a memory element 14 and vice versa. But, in various embodiments, it is possible for data to flow through the switching element 18 from one processing element 12 to another processing element 12 without first being stored in a memory element 14. It is also possible that data can flow from one memory element 14 through the switching element 18 to another memory element 14 without first being processed by a processing element 12.

In various embodiments, the configuration of the switching element 18 defines which ports 28 have a data path between them, for example the processing element 12 at port #1 is connected to the memory element 14 at port #8, the processing element 12 at port #2 is connected to the memory element 14 at port #6, etc. The configuration may be set by the control element 20 and may be changed dynamically by the control element 20 based on varying parameters as discussed below.

The ports 28 and the data paths of the switching element 18 may vary in width from single-bit serial to multi-bit parallel. The switching element 18 may be formed from a crossbar-type switch or similar switching topology, or combinations of both. The switching element 18 may be described as one or more code segments of an HDL and may be implemented in an FPGA or other PLD. The switching element 18 may also include digital logic circuitry, analog circuitry, or a combination of both as well as fully-custom or semi-custom ASICs.

In various embodiments, the control element 20 manages the operation of the reconfigurable interconnect network 16 by setting prioritization of processing data, scheduling of processing tasks and memory access, and load balancing of data flow. If a particular application is given critical status, the control element 20 may reallocate resources to accomplish the task. In such a situation, the control element 20 may send a signal to the appropriate processor interface units 22, memory interface units 24, and application control units 26 to suspend current actions. The control element 20 may split the application among multiple processing elements 12 and sufficient memory elements 14 to store the associated data. The control element 20 may also send a configuration setting to the switching element 18 to establish proper port 28 connections.

The control element 20 may also monitor data flow through the reconfigurable interconnect network 16. If a small number of processing elements 12 and memory elements 14 are handling a high percentage of the processing load, then the control element 20 may distribute the applications more evenly among the processing elements 12 and memory elements 14 by communicating with the switching element 18, the processor interface units 22, the memory interface units 24, and the application control units 26 to reroute data as possible to less heavily loaded processing elements 12 and memory elements 14.

The control element 20 may be described as one or more code segments of an HDL and may be implemented in an FPGA or other PLD. The control element 20 may include one or more finite state machines (FSMs) in addition to other control or glue logic and may be formed from digital logic circuitry, analog circuitry, or a combination of both. The control element 20 may also include fully-custom or semi-custom ASICs, microprocessors, microcontrollers, PICs, and the like, or combinations thereof.

In various embodiments, each processor interface unit 22 is associated with a processing element 12 and manages the flow of data to and from the processing element 12 based on the processing element's 12 capabilities. For example, the processor interface unit 22 may scale the magnitude of the data, or may adjust the format of the data by adjusting the bit width of a data word or by converting from floating-point notation to fixed-point notation or vice versa. The processor interface unit 22 may also adjust the data transfer rate to and from the processing element 12 by buffering incoming and outgoing data as necessary. Additionally, the processor interface unit 22 may receive scheduling and control information from the control element 20.

The processor interface unit 22 may include logic gates, shift registers, storage registers such as flip flops and latches, combinations thereof, and the like. The processor interface unit 22 may be described as one or more code segments of an HDL and may be implemented in an FPGA or other PLD. The processor interface unit 22 may also include one or more FSMs in addition to other control or glue logic and may be formed from digital logic circuitry, analog circuitry, fully-custom or semi-custom ASICs, microprocessors, microcontrollers, PICs, and the like, or combinations thereof.

In various embodiments, each memory interface unit 24 is associated with a memory element 14 and manages the flow of data to and from the memory element 14 based on the physical configuration of the memory element 14. The memory interface unit 24 may generate the appropriate addresses to send to the memory element 14 to indicate where to retrieve or store data in addition to generating appropriate physical control signals for the specific type of memory element 14 to which it is connected. As an example, the memory interface unit 24 may generate strobe and refresh signals for a DRAM structure. The memory interface unit 24 may also ensure that data to be stored in the memory element 14 is on the correct bus if the memory element 14 has more than one port. Furthermore, the memory interface unit 24 may synchronize data to be stored in the memory element 14 by buffering data and sending and receiving control signals when data is ready to be stored or retrieved. Additionally, the memory interface unit 24 may receive scheduling and control information from the control element 20.

The memory interface unit 24 may include logic gates, shift registers, storage registers such as flip flops and latches, combinations thereof, and the like. The memory interface unit 24 may be described as one or more code segments of an HDL and may be implemented in an FPGA or other PLD. The memory interface unit 24 may also include one or more FSMs in addition to other control or glue logic and may be formed from digital logic circuitry, analog circuitry, fully-custom or semi-custom ASICs, microprocessors, microcontrollers, PICs, and the like, or combinations thereof.

In various embodiments, each application control unit 26 is associated with a memory interface unit 24 and manages the flow of data to and from the memory interface 24 unit based on the application for which the memory element 14 is storing data. For example, solving a system of vector or matrix-based linear equations generally involves processing a row of matrix data at a time. Calculating an FFT generally involves processing data based on the point-size sample of a signal. Performing an FIR filter generally involves processing data based on the number of FIR filter coefficients. Thus, the application control unit 26 coordinates with the memory interface unit 24 to transfer data to and from the memory element 14 in blocks that are sized based upon the application. Additionally, the memory interface unit 24 may receive scheduling and control information from the control element 20.

The application control unit 26 may include logic gates, shift registers, storage registers such as flip flops and latches, combinations thereof, and the like. The application control unit 26 may be described as one or more code segments of an HDL and may be implemented in an FPGA or other PLD. The application control unit 26 may also include one or more FSMs in addition to other control or glue logic and may be formed from digital logic circuitry, analog circuitry, fully-custom or semi-custom ASICs, microprocessors, microcontrollers, PICs, and the like, or combinations thereof.

In various embodiments, the processing elements 12 and the reconfigurable interconnect network 16 are implemented in an FPGA 30, as shown in FIG. 1. The memory elements 14 are implemented as separate components. The FPGA 30 and the memory elements 14 may also be implemented as components mounted on a printed circuit board (PCB) or as components integrated in a multi-chip module (MCM) package. The processing elements 12 and the interconnect network 16 may be described as one or more code segments of an HDL and may be automatically programmed into the FPGA 30.

Separating the computing architecture 10 in this fashion allows the data processing and data routing functions of the processing elements 12 and the interconnect network 16 to optimized using the features and functions of the FPGA 30. Likewise, the memory elements 14 may be optimized or manufactured specifically for data storage.

Although the invention has been described with reference to the preferred embodiment illustrated in the attached drawing FIGURE, it is noted that equivalents may be employed and substitutions made herein without departing from the scope of the invention as recited in the claims.

Having thus described various embodiments of the invention, what is claimed as new and desired to be protected by Letters Patent includes the following:

1. A reconfigurable interconnect network for coupling a plurality of processing elements to a plurality of memory elements, the reconfigurable interconnect network comprising:
   a switching element implemented in one or more hardware devices and configured to provide a data path from any processing element of the plurality of processing elements to any memory element of the plurality of memory elements;
   a plurality of processor interface units implemented in one or more hardware devices, each processor interface unit coupled to one of the processing elements and to the switching element and configured to manage data flow to and from the processing element based on the performance of the processing element;
   a plurality of memory interface units implemented in one or more hardware devices, each memory interface unit coupled to one of the memory elements and configured to manage data flow to and from the memory element based on the physical configuration of the memory element; and
   a plurality of application control units implemented in one or more hardware devices, each application control unit coupled to one of the memory interface units and to the switching element and configured to manage the flow of data to and from the memory interface unit based on an application for which the memory element is storing data by coordinating with the memory interface unit to transfer data to and from the memory element in blocks that are sized based upon the application,
   each one of the plurality of processing elements being configured for a specific application such that each processing element presents a different configuration than the other processing elements to operate on a different application,
   each one of the plurality of memory elements being a physically separate memory device configured to store data related to a specific application such that each memory element presents a different physical configuration than the other memory elements to store data for a different application.

2. The reconfigurable interconnect network of claim 1, the reconfigurable interconnect network further comprising a control element, coupled to the switching element, the processor interface units, the memory interface units, and the application control units, for prioritizing and scheduling tasks and access, and load balancing data through the reconfigurable interconnect network.

3. The reconfigurable interconnect network of claim 1, wherein the reconfigurable interconnect network may be implemented in a field-programmable gate array.

4. A computing architecture comprising:
a plurality of processing elements for performing data processing computations, each one of the processing elements being configured for a specific application such that each processing element presents a different configuration than the other processing elements to operate on a different application;
a plurality of memory elements for storing computation results, each one of the memory elements being a physically separate memory device configured to store data related to a specific application such that each memory element presents a different physical configuration than the other memory elements to store data for a different application; and
a reconfigurable interconnect network including
a switching element implemented in one or more hardware devices and configured to provide a data path from any processing element of the plurality of processing elements to any memory element of the plurality of memory elements,
a plurality of processor interface units, each processor interface unit coupled to one of the processing elements and to the switching element, each processor interface unit configured to manage data flow to and from the processing element based on the performance of the processing element,
a plurality of memory interface units, each memory interface unit implemented in one or more hardware devices and coupled to one of the memory elements, each memory interface unit configured to manage data flow to and from the memory element based on the physical configuration of the memory element, and
a plurality of application control units, each application control unit implemented in one or more hardware devices and coupled to one of the memory interface units and to the switching element, each application control unit configured to manage the flow of data to and from the memory interface unit based on an application for which the memory element is storing data by coordinating with the memory interface unit to transfer data to and from the memory element in blocks that are sized based upon the application.

5. The computing architecture of claim 4, wherein the reconfigurable interconnect network further includes a control element, coupled to the switching element, the memory interface units, and the application control units, for prioritizing and scheduling tasks and access, and load balancing data through the reconfigurable interconnect network.

6. The computing architecture of claim 4, wherein the processing elements and the reconfigurable interconnect network are implemented in a field-programmable gate array.

7. A computing architecture comprising:
a plurality of memory elements for storing computation results, each one of the memory elements being a physically separate memory device configured to store data related to a specific application such that each memory element presents a different physical configuration than the other memory elements to store data for a different application; and
a field programmable gate array, programmed to include
a plurality of processing elements configured to perform data processing computations, each one of the processing elements being configured for a specific application such that each processing element presents a different configuration than the other processing elements to operate on a different application,
a switching element configured to provide a data path from any processing element of the plurality of processing elements to any memory element of the plurality of memory elements,
a plurality of processor interface units, each processor interface unit coupled to one of the processing elements and to the switching element, each processor interface unit configured to manage data flow to and from the processing element based on the performance of the processing element,
a plurality of memory interface units, each memory interface unit coupled to one of the memory elements and configured to manage data flow to and from the memory element based on the physical configuration of the memory element,
a plurality of application control units, each application control unit coupled to one of the memory interface units and to the switching element, each application control unit configured to manage the flow of data to and from the memory interface unit based on an application for which the memory element is storing data by coordinating with the memory interface unit to transfer data to and from the memory element in blocks that are sized based upon the application, and
a control element, coupled to the switching element, the processor interface units, the memory interface units, and the application control units, the control element configured to prioritize and schedule tasks and access, and load balancing data through the field programmable gate array.

* * * * *